3,198,763
POLYAMINE STABILIZER FOR OXIDIZABLE
ORGANIC MATERIALS
Hans Jakob Peterli, Basel-Land, Switzerland, assignor to
J. R. Geigy A.-G., Basel, Switzerland
No Drawing. Filed Apr. 6, 1961, Ser. No. 101,083
Claims priority, application Switzerland, Apr. 22, 1959,
72,378/59; Apr. 7, 1960, 3,910/60
17 Claims. (Cl. 260—45.8)

This application is a continuation-in-part of application Serial No. 23,630, filed April 21, 1960, now abandoned.

The present invention concerns a process for the stabilization of organic compounds which are sensitive to oxidising agents. The invention also concerns oxidative-resistant compositions of matter.

One aspect of the invention relates to a composition comprising a normally oxidisable organic material and a stabilizer, the improvement being that the stabilizer is a particular $\alpha.\gamma$-diamino-alkane derivative. According to this aspect, it has been found that organic substances which are sensitive to oxygen and oxidation can be stabilized very well if, to such substances, are added slight amounts, in the form of salts, of compounds of the general formula I

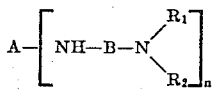

(I)

wherein
A represents an n-valent, aromatic, isocyclic or heterocyclic radical,
B represents a saturated aliphatic radical containing at least 3 carbon atoms, which is bound to the two N atoms by C atoms in the $\alpha.\gamma$-positions,
$R_1$ represents hydrogen,
$R_2$ represents hydrogen or an acyl group, or
$R_1$ and $R_2$ together represent an alkylidene or aralkylidene group, and
$n$ represents 1 or 2.

The compounds of the general Formula I are $\alpha.\gamma$-diaminoalkane derivatives in which the one amino group is substituted by a simply bound aromatic radical. The other amino group of the diaminoalkane radical is, advantageously, primary; in this case it can also be acylated. Finally, also an imino group can be present instead of this amino group; the nitrogen atom of the imino group is bound by a double linkage with a C atom of an organic radical. As compounds having such ylidene groups, in the process according to this aspect of the invention, mainly those so-called Schiff's bases are used which are obtained from N-aryl-diaminoalkanes by condensation with aliphatic or aromatic aldehydes and ketones. Compared wth the N-aryldiamindoalkanes from which they are derived, these Schiff's bases are often more lipophilic. This property is more advantageous for certain uses. The N'-o-hydroxybenzylidene - N - aryltrimethylenediamines are particularly valuable.

As defined, the aromatic radical bound by a simple linkage to the one nitrogen atom of the $\alpha.\gamma$-diaminoalkane radical can be isocyclic or heterocyclic. Because of their easier accessibility, isocyclically substituted $\alpha.\gamma$-diaminoalkanes are preferred. Mainly radicals of the benzene, naphthalene and acenaphthene series are used is isocyclic radicals. Advantageously they do not contain more than two benzene nuclei. Thus, apart from phenyl, naphthyl and acenaphthenyl radicals themselves, mainly diphenyl, diphenylamine, diphenylether, diphenylthioether, diphenyldisulphide, diphenylmethane or propane, diphenylketone, diphenyl sulphoxide and diphenyl sulphone radicals are used. The following can be named as substituents which occur in these aromatic radicals: methyl, ethyl, propyl, butyl or also higher alkyl groups, also cyclohexyl groups or other cycloaliphatic groups, then benzyl, phenethyl or other araliphatic radicals, also halogens, alkoxy and aryloxy groups, cyano, sulphamyl and, finally, also alkylsulphonyl arylsulphonyl and sulphonic acid arylester groups.

If $R_1$ and $R_2$ together represent a divalent radical, then this is, for example, a 1- or 2-butylidene radical, a cyclo hexylidene, benzylidene or o-hydroxybenzylidene radical.

Even if, because of their easier accessibility, such compounds are preferred which have a phenyl or naphthyl radical as aryl radical, still those derivatives are also particularly valuable protective agents according to this aspect of the invention which contain an amino or hydroxyl group, if desired further substituted, in the aryl radical. These amino and hydroxyl groups are, in mononuclear isocyclic radicals, advantageously in p- or o-position to the linkage to the $\alpha.\gamma$-diaminoalkane radical.

Valuable compounds for use according to this aspect of the invention are also those which contain two diaminoalkane radicals. Similar rules are applicable here. The more valuable products contain these groups in the monocyclic aryl radicals in the p-position to each other. In bicyclic aryl radicals, in particular those mentioned further above, they are advantageously in p.p'-positions.

In the N-aryl-$\alpha.\gamma$-diaminoalkane compounds or their derivatives used according to this aspect of the invention, the alkane radical is advantageously not further substituted, i.e., it is propane radical bound in the 1- and 3- positions. These compounds are particularly easily accessible and also have a particularly good action. However, also derivatives substituted in the 1.3-propane radical, for example by low alkyl groups or by hydroxy groups, have a good action and are also easily accessible technically. Thus, for example, N-aryl-2-hydroxy-1.3-diaminopropanes are obtained by adding epichlorohydrin to aromatic amines and treating the N-(3-chloro-2-hydroxypropyl)-arylamines so obtained with ammonia under pressure. Derivatives unsubstituted in the 1,3-propane radical are obtained, for example, by adding one mol of acrylonitrile per amino group and reducing the N-cyanoethyl arylamines so obtained. Another method consists in condensing 1-bromo-3-aminopropane in the form of the hydrobromide with aromatic amines. By a third method, aromatic hydroxyl compounds are condensed wth 1.3-diaminopropane in the presence of an acid catalyst such as, e.g., metaboric acid. Hydroxynaphthalene compounds can also be reacted with 1.3-diaminopropane under the conditions known for the so-called Bucherer reaction to form N-napthyl-1.3-diaminopropanes. The corresponding Schiff's bases or acyl derivatives which, as defined, can also be used are obtained by condensing the N-aryldiaminoalkanes so obtained with aldehydes or ketones, or by acylating under the usual conditions for these reactions.

It is often of advantage to use the compound of the general Formula I in the form of salts. Chiefly the salts of aliphatic or alicyclic carboxylic acids are used, for example, those of adipic acid and sebacic acid, of higher fatty acids, or of resinic acids or naphthenic acids. Such salts are often much more soluble in fats than the bases from which they are derived. For certain purposes, in particular when the substratum is impurified by slight amounts of heavy metals, also the salts of hydroxycarboxylic acids such as, e.g., the citrates, tartrates and lactates, can be used.

Organic substances which are sensitive to oxygen and auto-oxidation which can be stabilized by using the protective agents according to this aspect of the invention are, mainly, hydrocarbons, e.g., those boiling above 55° C., in particular gasolines, mineral oils, fats, animal and vegetable oils and waxes as well as oils and waxes based on synthetic esters, e.g., dioctyl sebacate, didecyl adipate, etc., in addition compounds containing ether and aldehyde groups, e.g., diethyl ether, polyethylene glycol, isopropyl methyl ether, butanal etc. and, finally, also other substances which contain multi-unsaturated carbon carbon linkages or tertiary carbon atoms, e.g., 2-methyl-3-hexene, cumene, p-cymene etc. Also polymeric substances such as natural rubber or synthetic rubber, e.g. polyisoprene, butadiene-styrene rubbers etc. or the synthetic high polymeric compounds as for example the polycondensed polyesters and in particular synthetic polymers having unsaturated groups or tertiary carbon atoms including polyparaffins and polymers of ethylenically unsaturated monomers free from a halogen, e.g., polypropylene, polystyrene, non-rubbery isoprene polymers, etc., can be stabilized with these N-aryl-α,γ-diaminoalkanes or derivatives thereof. Finally, some of these diaminoalkane derivatives are excellent polymerisation inhibitors.

In general, only slight amounts of these protective agents according to this aspect of the invention, for example 0.001 to 5% by weight of the carrier are needed to stabilize the substances which are sensitive to oxygen or auto-oxidation. The optimal amounts differ and depend, in the first place, on the nature of the substance to be protected as well as on the conditions to which it is to be subjected. The figures given in the following examples give certain indications for individual substrata and protective agents. Some of the compounds used have a rather specific protective action and are, therefore, particularly suitable for certain substances. Thus, for example, for the protection of benzines or other mineral oils, in particular N-(p-hydroxyphenyl)- and N-(p-aminophenyl)-1,3-diaminopropanes are suitable, the additional aromatically bound amino group of which can if desired be simply further substituted. On the other hand advantageously N-β-naphthyl-1.3-diaminopropanes are used as protective agents for rubber or similar synthetic elastomers. Finally, chiefly N-phenyl- and N-p-methoxyphenyl- 1.3-diaminopropanes are used as stabilizers for such substances which require stabilizing already at lower temperatures such as, for example, room temperature, e.g., aldehydes and easily polymerisable monomeric compounds.

Compared with the protective agents used up to now for the same purpose, the active substances according to this aspect of the invention—as can be seen from the following examples—have a better and more long lasting action when used in effective equivalent amounts.

More specifically, the compounds used according to this aspect of the invention correspond to the general formula $$A-\left[\underset{\mathrm{N}}{\overset{\mathrm{H}}{|}}-B-X\right]_n$$

wherein

A represents a radical selected from the group consisting of a radical of the benzene, naphthalene, acenaphthalene and quinoline series,
B represents a member selected from the group consisting of a hydroxytrimethylene radical and a divalent saturated hydrocarbon radical containing 3 to 6 carbon atoms, in both of which radicals the α.γ-carbon atoms are bound to the two nitrogen atoms,
X represents a member selected from the group consisting of the —NH₂,

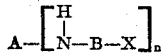

—N-alkylidene, —N-cyclohexylidene, —N-benzylidene and

—N-hydroxybenzylidene, acyl being a carboxylic acid acyl group, and
n represents one of the integers 1 and 2.

If A is a radical of the benzene series, then advantageously it is an unsubstituted phenyl radical or a phenyl radical substituted by hydroxy, monoalkylamino, monoarylamino, alkoxy, phenoxy or alkyl groups or by halogen atoms. Other preferred radicals for A are the naphthyl, acenaphthyl and quinolyl-8-radicals.

The radical B is preferably —CH₂CH₂CH₂—; but also the radicals:

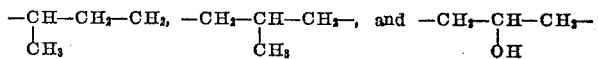

A particularly valuable class of compounds corresponds to the formula $$A-NH-CH_2-CH_2-CH_2-NH_2$$

wherein

A represents a radical selected from the group consisting of a radical of the benzene, naphthalene, acenaphthalene and quinoline series.

The following examples serve only to illustrate the foregoing aspect of this invention and do not limit it in any way. Where not expressly stated, parts are given as parts by weight and their relationship to parts by volume is as that of grammes to cubic centimetres. The temperatures are in degree centigrade.

Example 1

*Procedure.*—Mixtures of 20 g. of freshly distilled enanthol and 0.002 g. of each of the following stabilisers are placed in a shaking vessel. Each shaking vessel is attached to a gas burette and the mixtures are exposed to the action of oxygen. The amount of oxygen used is continually registered. Table I shows the result of this test:

*Table Ia'*

|  | B.P.ₐ₁ 0° | Take up of O² in parts by volume | | |
| --- | --- | --- | --- | --- |
|  |  | 5 hrs. | 20 hrs. | 70 hrs. |
| N-phenyl-1.2-diaminoethane_ | 140–144 | >>85 | >>85 | >>85 |
| N-phenyl-1.3-diaminopropane | 152–153 | 1 | 2 | 4 |
| N-phenyl-1.4-diaminobutane_ | 161–162 | >>85 | >>85 | >>85 |

N-phenyl-1.3-diaminopropane proves to be considerably better than the two comparable products.

Comparable results are obtained if, instead of N-phenyl-1.3-diaminopropane, 0.002 g. of N-phenyl-2-methyl-1.3-diaminopropane or 0.002 g. of N-phenyl-1-methyl-1.3-diaminopropane are used.

*Table 1b'*

|  | Take up of O² in parts by volume | | | |
| --- | --- | --- | --- | --- |
|  | 26 hrs. | 50 hrs. | 111 hrs. | 187 hrs. |
| N-phenyl-1.3-diaminopropane | 2 | 3 | 5 | 13 |
| di-tert.butyl-p-cresol | 20 | 43 | >>85 | >>85 |
| N-phenyl-naphthyl-(1)-amine | 4 | 8 | 20 | 85 |

N-phenyl-1.3-diaminopropane proves to be more active than the two antioxidants used in technical practice.

EXAMPLE 2

The action of the compounds in vulcanised rubber was tested with the aid of a modified Creep test (see ASTM D1206–52T). The rubber mixture used for the test is compounded as follows:

| | Parts |
|---|---|
| Hevea latex crêpe | 100 |
| Stearic acid | 1.5 |
| Zinc oxide | 5.0 |
| Diphenylguanidine | 1.0 |
| Sulphur | 2.5 |
| Antioxidant | 1.0 |

The rubber was vulcanised for 60 minutes at 140–145°C. The dimensions of the test strips are:

| | Cm. |
|---|---|
| Thickness | 0.06±0.01 |
| Width | 2.0 |
| Length (not stretched) | 10.0 |

The strips are stretched with enough weight to make the length at room temperature 12.0 cm. The strips are then hung in a chamber previously heated to 100±1°C in which the air can circulate (corresponding to ASTM D1206–52T). Differences in length are continually measured. Two parallel tests are made each time. The alteration in length is recorded as a function of time. As significant for the behaviour of the various mixtures, the time until the test strips have attained a length of 17.0 cm. is defined.

*Table 2*

| | Hours |
|---|---|
| N-phenyl-1.3-diaminopropane | 24 |
| N-phenyl-naphthyl-(2)-amine | 15 |
| polymerised trimethyldihydroquinoline | 11 |

EXAMPLE 3

*Test method.*—"Continental Oil Test," according to Ind. Eng. Chem., 33, 339 (1941).

13 cc. of "Regal Oil B" (a pure mineral oil free from additives destined for testing purposes and described in the Ind. Eng. Chem. referred to above), of the Texas Co. are exposed to an oxygen atmosphere in a system corresponding to that described in the above journal without mechanical shaking. The oxygen takeup is measured by measuring the drop in pressure by an Hg manometer attached to the system. The time until the drop in pressure is 60 mm. Hg is taken as criterion for the stability of the oil.

*Test conditions.*—5 copper wires (diameter: 1 mm.; length: 50 mm.) as oxidation catalyst and 0.5 pro mille of bis-o-hydroxy-benzylidene-1.2-propylenediamine ("Du Pont metal deactivator") are added to "Regal Oil B" and the oil so prepared is tested at a temperature of 115° C. At the same time, a sample of this oil which in addition contains 0.25% of the antioxidant to be tested, is subjected to the same test.

The stabilities measured are:

*Table 3*

| | Hours |
|---|---|
| Without antioxadant | 50 |
| N-o-hydroxyphenyl-1,3-diaminopropane M.P. 114° C | 550 |
| N-p-hydroxyphenyl-1.3-diaminopropane M.P. 130° C | 600 |
| N-p-hydroxyphenyl-N'-o-hydroxybenzylidene-1.3-diamino-propane M.P. 155° C. | 600 |
| N-p-hydroxyphenyl-N'-cyclohexylidene-1.3-diamino-propane (oil) | 500 |
| bis-(N-cyclohexylidene-3-aminopropyl)-p-phenyl-enediamine (oil) | 520 |
| N-cyclohexyl-p-aminophenol M.P. 178° C | 240 |
| N-phenylnaphthyl-(1)-amine | 220 |
| di-tert. butyl-p-cresol | 150 |
| di-sec. butyl-p-phenylenediamine | 270 |

The test shows that the 1.3-diaminopropane compounds used according to this aspect more effectively hinder the take up of oxygen than the four comparable products used in technical practice.

Similar good results are obtained if 0.25% of the following 1.3-diaminopropane compounds are used:
N-p-hydroxyphenyl-N'-benzylidene-1.3-diaminopropane,
N-p-hydroyphenyl-N'-1-butylidene-1.3-diaminopropane,
N-p-hydroxyphenyl-N'-2-butylidene-1.3-diaminopropane,
N-p-hydroxyphenyl-N'-2-octylidene-1.3-diaminopropane.

EXAMPLE 4

The procedure is the same as that described in Example 2.

*Table 4*

| | Hours |
|---|---|
| N-naphthyl-(2')-1.3-diaminopropane B.P.$_{11}$ 225–230° C | 34½ |
| N-phenylnaphthyl-(2)-amine | 15 |
| di-tert.butyl-p-cresol | 12 |
| di-sec.butyl-p-phenylenediamine | 22½ |

The test shows that in the "Creep Test," N-naphthyl-(2')-1.3-diaminopropane used according to this aspect is more effective than the three antioxidants used in technical practice.

EXAMPLE 5

The procedure is the same as that described in Example 1.

*Table 5*

| | Take up of $O_2$ in parts by volume | | |
|---|---|---|---|
| | 1 hr. | 15 hrs. | 40 hrs. |
| N-methyl-p-anisidine B.P.$_{11}$ 120° C | 10 | »85 | »85 |
| N-p-methoxyphenyl-1.2-diaminoethane B.P.$_{11}$ 170–172° C., M.P. 58° C | 8 | »85 | »85 |
| N-p-methoxyphenyl-1.3-diaminopropane B.P.$_{19}$ 180° C | 0 | 0 | 3 |
| N-p-ethoxyphenyl-1.3-diaminopropane B.P.$_{19}$ 186–187° C | 0 | 1 | 18 |
| p-Phenoxyphenyl-1.3-diaminopropane M.P. 78° C., B.P.$_{0.01}$ 180–185° C | 0 | 5 | 11 |

The test shows that the N-p-methoxyphenyl-1.3-diaminopropane, N-p-ethoxyphenyl-1.3-diaminopropane and p-phenoxyphenyl-1.3-diaminopropane used according to this aspect more effectively hinder the takeup of oxygen than N-methyl-p-anisidine or the corresponding ethylenediamine derivative.

EXAMPLE 6

The procedure is the same as that described in Example 1.

*Table 6*

| | Take up of $O_2$ in parts by volume | | |
|---|---|---|---|
| | 1 hr. | 15 hrs. | 40 hrs. |
| di-sec. butyl-p-phenylenediamine | 3 | 13 | »85 |
| N-p-sec. butylaminophenyl-1.2-diaminoethane B.P.$_{11}$ 200–201° C | 3 | 80 | »85 |
| N-p-sec. butylaminophenyl-1.3-diaminopropane B.P.$_{0.01}$ 170° C | 1 | 7 | 18 |

The test shows that N-p-sec.butylaminophenyl-1.3-diaminopropane used according to this aspect more effectively hinders the take up of oxygen than di-sec. butyp-phenylenediamine and N-p-sec. butyl aminophenyl-1.2-diaminoethane used in technical practice.

EXAMPLE 7

The procedure is the same as that described in Example 3.

Table 7

| | Hours |
|---|---|
| bis-N,N'-(3-aminopropyl)-p-phenylenediamine, B.P.$_{0.04}$ 245° C. | 550 |
| di-sec. butyl-p-phenylenediamine | 270 |
| phenylnaphthyl-(1)amine | 220 |

The test shows that the bis-N,N'-(3-aminopropyl)-p-phenylene-diamine used according to this aspect more effectively hinders the take-up of oxygen than the two comparable products used in technical practice.

Similar good results are obtained if, instead of N,N'-bis-(3-aminopropyl) - phenylenediamine, N,N'-bis-(3-aminopropyl)-o-phenylenediamine or N,N'-bis-(3-aminopropyl)-p,p'-diaminodiphenylamine are used.

EXAMPLE 8

Hindering peroxide formation in hydrocyclic compounds:

The action of stabilizers in hindering the formation of peroxide of tetrahydronaphthalene in the presence of oxygen is tested with the aid of the apparatus described in example 1. Mixtures of 20 g. of tetrahydronaphthalene and 0.02% of each of the following inhibitors are shaken for 46 hours in an oxygen atmosphere. At the end of this time, the peroxides formed are determined by the method of Wagner, Smith and Peters (Anal. Chem., 19, 976, (1947)).

The protection values given in Table 8 are calculated according to the formula $$\frac{v_0 - v_i}{v_0} \cdot 100$$

in which $v_0$ represents the parts by volume of sodium thiosulphate solution of the control test used without stabilizer and $v_1$ represents the parts by volume of the sodium thiosulphate solution used in the test with the corresponding stabilizer.

Table 8

| Stabilizer: | Percent protection |
|---|---|
| N-2-ethylnaphthylamine | 59 |
| N-naphthyl-(2')-diaminoethane M.P. 60° C. | 50 |
| N-naphthyl - (2')-1.3-diaminopropane B.P.$_{11}$ 225–230 C | 98.7 |
| N-naphthyl - (1')1.3 - diaminopropane B.P.$_{11}$ 204–208'' C | 98 |
| N-(5') - acenaphthyl-1.3-diaminopropane B.P. 68° C. | 99 |
| N-N'-bis-(3-aminopropyl)- o-phenylenediamine B.P.$_{0.003}$ 174–186° C | 98 |

This test also shows that the 1.3-diaminopropane compounds are much more effective than the comparable products.

Similar good results are obtained if, instead of N-acenaphthyl-(5')-1.3 - diaminopropane, N-acenaphthyl-N'-cyclohexylidene-1.3-diaminopropane is used.

EXAMPLE 9

The procedure is the same as that described in Example 3.

Table 9

| Stabiliser: | Hours |
|---|---|
| Without antioxidant | 50 |
| phenyl-1.2-diaminoethane B.P.$_{12}$ 140–144° C. | 50 |
| N-p-tolyl - 2-hydroxy-1.3-diaminopropane M.P. 60° C, B.P.$_{0.02}$ 157° C | 185 |
| N-acetyl-N'- phenyl-1.3-diaminopropane B.P.$_{0.04}$ 170–172° C. | 160 |

This test shows that the diaminopropane derivates are active antioxidants in contrast to the ethylenediamine derivative tested.

Similar good results are obtained if, in the above example, instead of N-p-tolyl-2-hydroxy-1.3-diaminopropane, 0.25% of N-p-chlorophenyl-2-hydroxy-1.3-diaminopropane, N-butyryl-N'phenyl-1.3-diaminopropane, N'-benzoyl-N-phenyl-1.3-diaminopropane, bis-(N-phenyl-1.3-diaminopropane)-N'-adipic acid diamide or bis(N-phenyl-1.3-diaminopropane)-N'-terephthalic acid diamide is used.

EXAMPLE 10

The procedure is the same as that described in Example 1.

Table 10

| | Take-up of $O_2$ in parts by volume | | | |
|---|---|---|---|---|
| | 14 hours | 38 hours | 62 hours | 86 hours |
| N.N'-di-sec.butyl-p-phenylene-diamine | 7 | >>80 | >>80 | >>80 |
| N-quinolyl-(8')-1.3-diaminopropane B.P.$_{0.04}$ 180° C | 2 | 5 | 11 | 43 |

The test shows that the N-quinolyl-(8')-1.3-diaminopropane considerably better inhibits the take-up of oxygen than the N.N'-disec.butyl-p-phenylenediamine frequently used in technical practice.

A similarly good action is obtained if, in the above example, N-quinolyl-(8')-N'cyclohexylidene-1.3-diaminopropane is used.

EXAMPLE 11

Unstabilized polyethylene powder and 0.1% of antioxidant are mixed in a rolling drum and then milled at 160° C. for 30 minutes until homogenous material is obtained. Sheets of 1 mm. thickness are then pressed from this material. 0.2 g. of these sheets are then aged in an oxygen atmosphere at 140° and take-up of oxygen is measured. The following Table 11 shows the times in which 5 ml. of oxygen are taken up.

Table 11

| | Hours |
|---|---|
| Without antioxidant | 7 |
| N-p-methoxyphenyl-1.3-diaminopropane | 48 |
| N-p-hydroxyphenyl - N'-o - hydroxybenzylidene-1.3-diaminopropane | 88 |
| N-p-phenylaminophenyl-1.3 - diaminopropane, M.P. 88° C. | 191 |

The test shows that the 1.3-diaminopropane derivatives greatly inhibit the take up of oxygen in polyethylene.

EXAMPLE 12

*Test method.*—Swift test according to F. Wenger, reported in the "Gebiete der Lebensmitteluntersuchungen," 45 (1954), 364.

10 mg. of the stabilizer to be tested is added to 20 g. of fat (cottonseed oil) and 5 ml./sec. of pure air are passed through the mixture which is in a test tube in a water bath of 100° C. The peroxide content of the aired samples is measured periodically.

After two hours, the samples without stabilizer have taken up twice the amount of peroxide compared with the peroxide content of the samples, after 20 hours, which contain N-p-hydroxyphenyl-1.3-propylenediamine, N,N'-bis-(cyclohexylidene-3-aminopropyl)-p-phenylenediamine or N-phenylaminophenyl-1.3-propylenediamine.

A second aspect of the invention concerns polymeric polyamides which are stable to oxidation as well as a process for their production.

It has been found that polymeric polyamides which are more stable to oxidation, in particular those which can be formed into fibres and films, are obtained if in the polycondensation of diamines and dicarboxylic acids or the polymerisation of ω-aminocarboxylic acids or the lactams thereof, said polymerisation is performed in the presence of compounds of the general Formula II

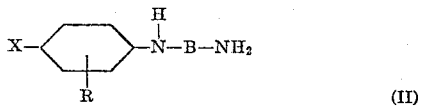

the compounds if desired in the form of their salts with carboxylic acids, or in the form of their acyl compounds.

In this formula:

X represents a positivising, salt-forming group,

B represents an alkylene radical having at least three carbon atoms, in which radical the two N atoms are in the $\alpha.\gamma$-position to each other, advantageously the trimethylene radical, R represents hydrogen, an alkyl or alkoxy group or a halogen atom.

As positivising, salt-forming group, X represents both a group which can split off a proton, advantageously the hydroxyl group, as well as a group which can add a proton, mainly an amino group, in particular a secondary amino group such as, e.g., the phenylamino group or another —NH—B—NH$_2$ group.

R is advantageously hydrogen; however, it can also be, for example, the methyl, ethyl, propyl or the normal, secondary or tertiary butyl group; it can also be the methoxy or ethoxy group or also a chlorine or bromine atom.

The compounds of the general Formula II are obtained for example from primary amines of the benzene series of the general Formula III

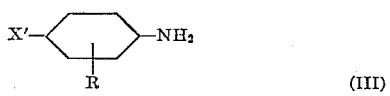

wherein R has the meaning given under Formula II and X' is a primary amino group, an acylated primary or acylated secondary amino group, a tertiary amino group, an arylamino or a hydroxyl group, by adding an aliphatic $\alpha.\beta$-unsaturated nitrile, advantageously acrylonitrile, reducing the N-cyanoalkyl compounds obtained and saponifying any acylamino groups present to amino groups. The compounds of the general Formula II can also be produced by condensing primary amines of the benzene series of the general Formula III with $\alpha$-halogen-$\gamma$-aminoalkanes, advantageously with 1-bromo-3-aminopropane, and saponifying any acylamino groups present to amino groups.

Acyl compounds of amines of the general Formula II used according to this aspect of the invention are obtained by acylating according to the usual acylating methods, e.g., with acetanhydride. It is preferred to employ compounds of the Formula II that are not acylated.

As salts of amines of the Formula II which can also be used according to this aspect of the invention, advantageously those with monobasic acids, in particular acetic acid, or with dibasic acids, chiefly adipic acid and sebacic acid are utilised.

A preferred compound, according to this second aspect of the invention, is one specific to general Formula II where X is OH of NR$_1$R$_2$ wherein R$_1$ and R$_2$ independent of each other is a hydrogen; alkyl, e.g., methyl, ethyl, propyl, butyl, octyl, decyl, dodecyl, etc., especially an alkyl containing one to eight carbon atoms; substituted alkyl, e.g., cyanoalkyl containing 1–4 carbon atoms in the alkyl group especially those containing 1–2 carbon atoms in the alkyl group, aminoalkyl containing 2–6 carbon atoms in the alkyl group especially those containing 2–3 carbon atoms, carboxyalkyl containing 1–4 carbon atoms in the alkyl group especially those containing 1–2 carbon atoms in the alkyl group; a cycloalkyl, e.g., cyclopentyl, cyclohexyl and cycloheptyl and the methyl substituted cyclopentyl and cyclohexyl especially the cyclohexyl; phenyl; and substituted phenyl, e.g., alkyl phenyl especially the alkyl phenyls containing 1–4 carbon atoms in the alkyl group, the methyl phenyls being particularly good, alkoxy phenyl especially the alkoxy phenyls containing 1–4 carbon atoms in the alkoxy group methoxy phenyl and ethoxy phenyl being particularly effective, alkylamino phenyls especially the lower alkylamino phenyls containing 1–4 carbon atoms in the alkyl groups and also aminophenyls. B is an alkylene group containing 3–4 carbon atoms and R is a hydrogen, a lower alkyl containing 1–4 carbon atoms, halogen, e.g., chlorine or bromine especially chlorine, and lower alkoxy especially those containing 1–4 carbon atoms.

The compounds of the general Formula II are added, advantageously in amounts of 0.001–5% (calculated on the total weight of the substances to be polycondensed or polymerised), to the diamines and dicarboxylic acids or to the $\omega$-aminocarboxylic acids or lactams thereof at any stage of the polycondensation or polymerisation, advantageously right at the beginning. The compounds of the Formula II are condensed to a great extent into the polymolecule under the usual polycondensation or polymerisation conditions in polyamide synthesis, i.e., they are linked at their primary amino groups which are possibly acylated (any N-acyl group present being split off) with the carboxylic acid groups of the polymolecule in an acid amide like manner. They become, thus, components of the polymolecule.

The addition, particularly of large amounts, of the compounds of Formula II to be used according to this second aspect of the invention can influence the degree of polymerisation. As the degree of polymerisation is usually influenced by the addition of so-called regulators such as acetic acid or sebacic acid, the amount of the compounds of the Formula II and that of the regulators should be synchronised.

The compounds of the general Formula II can also be added to a preformed polymeric polyamide and the mixture heated to a temperature at which equilibrization of the polymeric polyamide chains with Formula II compound takes place. This results in the direct condensation of Formula II compound with the polymer and results in the formation of a polymeric polyamide of improved oxidation stability. Advantageously the temperature at which equilibrization takes place is in the range of 200–260° C.

The polyamides produced according to this aspect of the invention are mechanically and chemically very similar to those produced in the usual way but they are different from the polyamides produced in the usual way in their considerably greater stability to oxidation. Thus they enable films and threads to be produced by the usual methods which, even after frequent washing with water are remarkably stable.

Further details will be seen from the following examples which only serve to illustrate this second aspect of the invention. Where not expressly stated otherwise, parts are given as parts by weight. The relationship of parts by weight to parts by volume is as that of grammes to cubic centimetres. The temperatures are in degrees centigrade.

EXAMPLE 13

400 parts of caprolactam,
40 parts of water
0.4 part of the stabilizing agents given in Tables 1a to 3a are mixed and heated until the mass becomes liquid which is at about 70°.

The liquid mixture is put into an autoclave made of non-rusting material and heated, while excluding oxygen, to a temperature of about 250° within one hour. A pressure of about 10–15 atm. occurs.

At the end of this time the water is distilled off and then the polymeric mass is kept at 250° without pressure to completely eliminate the gases formed.

By this time the mass has attained a viscosity which enables the polymer to be expressed by means of nitrogen through a valve placed on the bottom of the autoclave.

The spin valve used has an inner diameter of 1 mm. and a length of 10 mm. The polymer is expressed through the valve by means of nitrogen of 15–20 atm. pressure and the thread which solidifies from the melt is drawn off at the rate of 150 metres per minute. Between the valve and the spool onto which the thread is wound, a cooling bath (water of room temperature) is fixed in order to completely cool the monofilament; it is directed through the bath by means of a guide roller. Monomers are removed from the monofilament, which is wound crosswise on a perforated spool, by extraction with 70° warm water. The filament is then stretched between two rollers, one of which is rotating four times faster than the other, care being taken to allow no slippage.

The monofilaments have the mechanical properties, such as tensile strength and elongation at break and relative viscosity, given in Tables 1a to 3a.

The relative viscosity is measured each time in concentrated sulphuric acid (96%) at a concentration of 1.00 g./100 ml. at 20°.

The tensile strength and elongation at break of the samples as such are determined by 30 measurements made at the beginning and at the end of the thread. The remainder of the thread is stored in a chamber in which air of 165° circulates and the average alteration of these characteristics after the times given in Tables 1a and 2a is determined by 30 measurements.

The following Table 1a shows that polycaprolactam stabilized according to this aspect (Nos. 6 to 8) has considerably longer life than polycaprolactam stabilized with the usual stabilizing agents (Nos. 2 to 5).

If, instead of caprolactam, 11-aminoundecylic acid is used and otherwise the same procedure is followed, then analogous results are obtained.

Similar results are obtained if, instead of the compounds used in samples Nos. 6 and 8, their acetylated derivatives or their adipic acid or sebacic acid salts are used.

*Table 1a*

[Dependency of the tensile strength in g./denier (measured in the machine for measuring tensile strength "Schopper") on the length of treatment at a temperature of 165° in the circulating air chamber. (Loosely wound spools.)]

| No. | Polyamide stabilized by addition of 0.1% of the following stabilizers | Hours at 165° | | | | |
|---|---|---|---|---|---|---|
| | | 0 | 12 | 18 | 24 | 30 |
| 1 | Without additive | 4.60 (100%) | 2.2 (48%) | | | |
| 2 | 2.6-di-tert-butyl-p-cresol | 4.60 (100%) | 1.90 (42%) | | | |
| 3 | N.N'-di-cyclohexyl-p-phenylenediamine | 4.60 (100%) | 2.60 (57%) | Not measurable. | | |
| 4 | N.N'-di-sec.butyl-p-phenylenediamine | 4.20 (100%) | 2.60 (61%) | | | |
| 5 | N-cyclohexyl-p-aminophenol | 4.30 (100%) | 2.20 (51%) | | | |
| 6 | N-p-hydroxyphenyltrimethylenediamine M.P. 130° | 4.24 (100%) | 4.10 (96%) | 3.60 (86%) | 2.80 (65%) | 2.32 (55%) |
| 7 | N-(3-aminopropyl)-N'-phenyl-p-phenylenediamine M.P. 88° | 4.43 (100%) | 3.73 (84%) | 3.70 (84%) | 3.50 (78%) | 3.00 (67%) |
| 8 | N.N'-bis-(3-aminopropyl)-p-phenylenediamine B.P.$_{0.04}$ 245°, M.P. 92° | 3.80 (100%) | 3.90 (104%) | 3.70 (97%) | 3.50 (93%) | 3.11 (82%) |

The stabilizing agents Nos. 6 to 8 are produced by the usual reduction (see Whitemore et al., J.A.C.S., 66, 725 (1944) of the corresponding cyanoethyl compounds (S. A. Heiniger, J. Org. Chem., 22, 1213 (1957), Bates et al., J. Chem. Soc., 1956, 388, and Braunholtz et al., J. Chem. Soc., 1953, 1818).

The N-(β-cyanoethyl)-N'-phenyl-p-phenylenediamine (M.P. 135°) used for the production of the stabilizer No. 7 is also produced according to S. A. Heiniger, J. Org. Chem., 22, 1213 (1957), Bates et al., J. Chem. Soc., 1956, 388, and Braunholtz et al., J. Chem. Soc., 1953, 1818.

The adipic acid or sebacic acid salt of N-p-hydroxyphenyltrimethylenediamine also used as stabilizer melts at 160° or 173° respectively.

The adipic acid salt of N.N'-bis-(3-aminopropyl)-p-phenylenediamine melts at 190°.

*Table 2a*

[Dependency of the elongation at break on the length of the treatment at a temperature of 165° in the circulating air chamber]

| No. | Polyamide stabilized by addition of 0.1% of the following stabilizers | Hours at 165° | | | | |
|---|---|---|---|---|---|---|
| | | 0 | 12 | 18 | 24 | 30 |
| 1 | Without additive | 28 (100%) | 9.8 (35%) | | | |
| 2 | 2.6-di-tert. butyl-p-cresol | 27 (100%) | 8.0 (29%) | | | |
| 3 | N.N'-dicyclohexyl-p-phenylenediamine | 27 (100%) | 12 (46%) | Not measurable. | | |
| 4 | N.N'-di-sec. butyl-p-phenylenediamine | 21 (100%) | 10 (47%) | | | |
| 5 | N-cyclohexyl-p-aminophenol | 39 (100%) | 6.9 (18%) | | | |
| 6 | N-p-hydroxyphenyltrimethylenediamine | 20 (100%) | 25 (122%) | 21 (104%) | 12 (59%) | 10 (50%) |
| 7 | N-(3-aminopropyl)-N'-phenyl-p-phenylenediamine | 38 (100%) | 30 (78%) | 25 (67%) | 23 (60%) | 17 (46%) |
| 8 | N.N'-bis-(3-aminopropyl)-p-phenylenediamine | 22 (100%) | 22 (100%) | 25 (113%) | 21 (91%) | 18 (83%) |

Table 3a

[Dependency of the relative viscosity (measured in the "Ostwald-Viscosimeter") on the length of the treatment at a temperature of 165° in the circulating air chamber]

| No. | Polyamide stabilized by addition of 0.1% of the following stabilizers | Hours at 165° | | | | |
|---|---|---|---|---|---|---|
| | | 0 | 12 | 18 | 24 | 30 |
| 1 | Without additive | 2.52 | 1.52 | | | |
| 2 | 2.6-di-tert.butyl-p-cresol | 2.47 | 1.49 | | | |
| 3 | N.N'-dicyclohexyl-p-phenylenediamine | 2.48 | 1.53 | All less than 1.45. | | |
| 4 | N.N'-di-sec.buty.-p-phenylenediamine | 2.40 | 1.48 | | | |
| 5 | N-cyclohexyl-p-aminophenol | 2.57 | 1.58 | | | |
| 6 | N-p-hydroxyphenyltrimethylenediamine | 2.56 | 2.16 | 2.00 | 1.86 | 1.75 |
| 7 | N-(3-aminopropyl)-N'-phenyl-p-phenylenediamine | 2.34 | 2.02 | 1.89 | 1.80 | 1.70 |
| 8 | N.N'-bis-(3-aminopropyl)-p-phenylenediamine | 2.45 | 2.20 | 2.11 | 2.03 | 1.96 |

EXAMPLE 14

300 parts of hexamethylenediammonium adipate (AH salt) are dissolved in 300 parts of distilled water at 80°. 1.8 parts of sebacic acid as well as 0.3 part of the stabilizers described in Tables 4a to 6a are added to the solution.

The liquid mixture is placed in an autoclave previously heated to about 150° while excluding oxygen. The temperature in the autoclave is brought to 280° within one hour, during which time the steam pressure in the autoclave is kept under 30 atm. by allowing the steam to escape. On attaining the maximum temperature of 280–290°, the pressure in the autoclave is reduced within 10–20 minutes to atmospheric pressure by releasing the liquid components. The mass is then kept for about 4 hours at 280° under strict exclusion of oxygen. At the end of this time the polycondensation has advanced so far that it can be expressed by means of nitrogen through a valve in the bottom of the autoclave as a viscous melt.

This melt is worked up as described in Example 13 into stretched threads. The tensile strength, elongation at break and relative viscosity are measured as described in Example 13.

It can be seen from the following Table 4a polyhexamethylenediamine adipate stabilized according to this second aspect of the invention (Nos. 2 and 3) has a considerably longer life than unstabilized polyhexamethylenediamine adipate.

If, instead of hexamethylenediammoniumadipate, the hexamethylenediammonium sebacate is used and otherwise the same procedure is followed, then analogous results are obtained.

Table 4a

[Dependency of the tensile strength (in g./denier) on the length of treatment at a temperature of 165° in the circulating air chamber]

| No. | Polyamide stabilized by addition of 0.1% of the following stabilizers | Hours at 165° | | | | |
|---|---|---|---|---|---|---|
| | | 0 | 6 | 12 | 18 | 24 |
| 1 | Without additive | 3.86 (100%) | 2.65 (69%) | 2.71 (70%) | Not measurable | |
| 2 | N-p-hydroxyphenyltrimethylenediamine | 4.30 (100%) | 4.04 (95%) | 4.06 (94%) | 3.81 (90%) | 3.34 (78%) |
| 3 | N.N'-bis-(3-aminopropyl)-p-phenylenediamine | 3.96 (100%) | 4.24 (107%) | 4.43 (112%) | 4.21 (106%) | 4.17 (105%) |

Table 5a

[Dependency on the elongation at break (in percent) on the length of the treatment at a temperature of 165° in the circulating air chamber]

| No. | Polyamide stabilized by addition of 0.1% of the following stabilizers | Hours at 165° | | | | |
|---|---|---|---|---|---|---|
| | | 0 | 6 | 12 | 18 | 24 |
| 1 | Without additive | 22.75 (100%) | 10.00 (44%) | 4.75 (21%) | Not measurable. | |
| 2 | N-p-hydroxyphenyltrimethylenediamine | 21.15 (100%) | 26.50 (127%) | 25.20 (120%) | 11.25 (55%) | 8.6 (41%) |
| 3 | N.N'-bis-(3-aminopropyl)-p-phenylenediamine | 26.85 (100%) | 26.35 (98%) | 22.90 (86%) | 12.50 (47%) | 10.40 (39%) |

Table 6a

[Dependency of the relative viscosity on the length of the treatment at a temperature of 165° in the circulating air chamber]

| No. | Polyamide stabilized by addition of 0.1% of the following stabilizers | Hours at 165° | | | | |
|---|---|---|---|---|---|---|
| | | 0 | 6 | 12 | 18 | 24 |
| 1 | Without additive | 2.29 | 1.76 | 1.67 | 1.49 | |
| 2 | N-p-hydroxyphenyltrimethylenediamine | 2.64 | 2.26 | 1.97 | 1.85 | 1.68 |
| 3 | N.N'-bis-(3-aminopropyl)-p-phenylenediamine | 2.41 | 2.00 | 1.93 | 1.91 | 1.79 |

EXAMPLE 15

Bought polyamide chips (nylon 66) are dried so that the water content is less than 0.1% and then thoroughly mixed in a mixing drum with 0.1% of the stabilizing agents described in Example 14. This mixture is melted at a temperature of 285° while excluding oxygen and the melt is spun within one hour into monofilaments by expressing it through a valve. The monofilaments are then stretched on the stretching machine in a ratio of 3.8:1 and tested by the methods described in Example 14.

The results correspond in every way to those described in Example 14.

Other polyamides such as e.g., polycaprolactam or polyhexamethylenediamine sebacate can be worked up into products which are stable to oxidation in the same way.

EXAMPLE 16

The following Table 6a shows the number of hours necessary to effect a decrease in the resistance to breaking to 80% of the original resistance, when a polymeric polyamide is stabilized with a stabilizer at 165° in a circulating air chamber. The polymers are produced as described in Example 13. The resistance to breaking is determined by 30 measurements and the times are established by linear interpolation of the values measured.

Table 6a
SECTION I—COMPARABLE SUBSTANCES

| No. | Polyamide stabilized by addition of 0.1% of the following stabilizers | Hours at 165° |
|---|---|---|
| 1 | Without additive | 3 |
| 2 | 2.6-di-tert.butyl-p-cresol | 3 |
| 3 | N.N'-di-cyclohexyl-p-phenylenediamine | 5 |
| 4 | N.N'-di-sec.butyl-p-phenylenediamine | 6 |
| 5 | N-cyclohexyl-p-aminophenol | 5 |

SECTION II

| 6 | N-p-hydroxyphenyl-trimethylenediamine | 20 |
|---|---|---|
| 7 | N-(3-aminopropyl)-p-phenylenediamine | 10 |
| 8 | N'-cyclohexyl-N-(3-aminopropyl)-p-phenylenediamine | 21 |
| 9 | N'-phenyl-N-(3-aminopropyl)-p-phenylenediamine | 21 |
| 10 | N'.N'-dimethyl-N-(3-aminopropyl)-p-phenylenediamine | 10 |
| 11 | N'.N-bis-(3-aminopropyl)-p-phenylenediamine | 30 |
| 12 | Adipic acid salt of N-p-hydroxyphenyl-trimethylenediamine (1:2) | 20 |
| 13 | Sebacic acid salt of N-p-hydroxyphenyl-trimethylenediamine (1:2) | 15 |
| 14 | N-(2-aminoethyl)-N'-(3-aminopropyl)-p-phenylenediamine | 20 |
| 15 | N-octyl-N'-(3-aminopropyl)-p-phenylenediamine | 10 |
| 16 | N-phenyl-N'-(3-amino-2-methylpropyl)-p-phenylenediamine | 15 |
| 17 | N-(3-acetylaminopropyl)-p-aminophenol | 10 |
| 18 | N-(2-cyanoethyl)-N'-(3-aminopropyl)-p-phenylenediamine | 21 |

Similar results, as in section II of Table 6a, are obtained, if the following compounds are added in place of the above stabilizers.

N-(3-aminopropyl)-2-methyl-4-aminophenol
N-(3-aminopropyl)-2-tert.butyl-4-aminophenol
N-(3-aminopropyl)-3-chloro-4-aminophenol
N-(3-aminopropyl)-N'-(p-aminopheyl) - p - phenylenediamine
N-(3-aminopropyl)-N'-(sec.butyl-aminophenyl) - p-phenylenediamine
N-(3-aminopropyl)-N'-(p-ethoxyphenyl) - p - phenylenediamine
N-(2-carboxyethyl)-N'-(3-aminopropyl)-p - phenylenediamine
N-(3-aminopropyl)-N' - (cyanomethyl) - p - phenylenediamine
N-(3-amino-2-methylpropyl)-p-aminophenol
N-(3-aminopropyl)-2-methoxy-4-aminophenol
N-(3-aminopropyl)-N'-(p-methylphenyl)-p - phenylenediamine
N-(carboxymethyl)-N'-(3-aminopropyl)-p - phenylenediamine
N-(3-aminopropyl)-N'-(p-methoxyphenyl)-p - phenylenediamine
N-(3-aminopropyl)-N'-(p-methylaminophenyl) - p-phenylenediamine

What I claim is:

1. An oxidation-resistant composition comprising an auto-oxidizable organic material and 0.001 to 5% by weight of compound of the formula

wherein

A is an n-valent radical of a compound selected from the group consisting of benzene, hydroxy benzene, lower alkoxy benzene, lower alkyl benzene, chlorobenzene, aminobenzene, N-alkylated aminobenzene wherein alkyl is of from 1 to 12 carbon atoms, naphthyl, acenaphthyl, quinoline and diphenylamine, B is a member selected from the group consisting of a hydroxytrimethylene radical and a divalent saturated hydrocarbon radical containing 3 to 6 carbon atoms, in both of which radicals the α.γ-carbon atoms are bound to the two nitrogen atoms, X is a member selected from the group consisting of —NH₂,

—N-alkylidene of from 4 to 8 carbon atoms, —N-cyclohexylidene, —N-benzylidene and —N-hydroxybenzylidene wherein the acyl group is selected from the group consisting of alkanoyl of from 1 to 4 carbon atoms, benzoyl, amidoadipoyl, and amidoterephthaloyl, and n is one of the integers 1 and 2.

2. An oxidation-resistant composition comprising an auto-oxidizable organic material and 0.001 to 5% by weight of compound of the formula

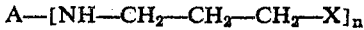

wherein

A is an n-valent radical of a compound selected from the group consisting of benzene, hydroxy benzene, lower alkoxy benzene, lower alkyl benzene, chlorobenzene, aminobenzene, N-alkylated aminobenzene wherein alkyl is of from 1 to 12 carbon atoms, naphthyl, acenaphthyl, quinoline and diphenylamine, X is a member selected from the group consisting of —NH₂,

—N-alkylidene of from 4 to 8 carbon atoms, —N-cyclohexylidene, —N-benzylidene and —N-hydroxybenzylidene wherein the acyl group is selected from the group consisting of alkanoyl of from 1 to 4 carbon atoms, benzoyl, amidoadipoyl, and amido-terephthaloyl, and n is one of the integers 1 and 2.

3. An oxidation-resistant composition comprising an auto-oxidizable organic material and 0.001 to 5% by weight of compound of the formula

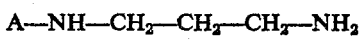

wherein

A is an n-valent radical of a compound selected from the group consisting of benzene, hydroxy benzene, lower alkoxy benzene, lower alkyl benzene, chlorobenzene, aminobenzene, N-alkylated aminobenzene wherein alkyl is of from 1 to 12 carbon atoms, naphthyl, acenaphthyl, quinoline and diphenylamine.

4. An oxidation-resistant composition comprising an auto-oxidizable organic material and 0.001 to 5% by weight of N-p-hydroxyphenyl-1.3-diaminopropane.

5. An oxidation-resistant composition comprising an auto-oxidizable organic material and 0.001 to 5% by weight of N-phenyl-1.3-diaminopropane.

6. An oxidation-resistant composition comprising an auto-oxidizable organic material and 0.001 to 5% by weight of N-naphthyl-(2')-1.3-diaminopropane.

7. An oxidation-resistant composition comprising an auto-oxidizable organic material and 0.001 to 5% by weight of N-p-phenylaminophenyl-1.3-diaminopropane.

8. An oxidation-resistant composition comprising an auto-oxidizable organic material and 0.001 to 5% by weight of N.N'-bis-(N'''-cyclohexylidene-3-aminopropyl)-p-phenylenediamine.

9. Process according to claim 17 wherein the polymerizable amide forming monomer is ω-aminocarboxylic acid.

10. Process according to claim 17 wherein the polymerizable amid is caprolactam.

11. Process according to claim 17 wherein the polymerizable amide is preformed polymeric polyamide.

12. Process according to claim 17 wherein the polymerizable amide is a mixture of hexamethylenediammonium adipate and sebacic acid.

13. Process according to claim 17 wherein the active component is N-p-hydroxyphenyltrimethylenediamine.

14. Process according to claim 17 wherein the active component is N-(3-aminopropyl)-N'-phenyl-p-phenylenediamine.

15. Process according to claim 17 wherein the active component is N,N'-bis-(3-aminopropyl)-p-phenylenediamine.

16. Polymeric polyamides, stable against oxidation, prepared according to the process according to claim 17.

17. Process for the production of polymeric polyamides formable into fibres and films, stable against oxidization, which comprises
   (1) condensing a polymerizable monomer selected from the group consisting of an ω-aminoalkanoic acid, a lactam thereof, and a substantially equimolar mixture of alkanoic dicarboxylic acid and alkylenediamine, to obtain the corresponding polymeric polyamide formable into fibres and films, and
   (2) adding to the polymerizing mass, during said condensation, from 0.001 to 5% by weight, calculated on the total weight of the reactants, of active compound selected from the group consisting of
   (a) a compound of the formula

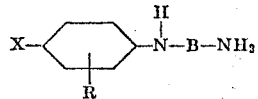

wherein
   X is a member selected from the group consisting of —OH and —NR₁R₂, R₁ and R₂ being independently selected from the group consisting of hydrogen, alkyl, substituted alkyl, cycloalkyl, phenyl and substituted phenyl,
   B is divalent saturated hydrocarbon radical containing at least 3 carbon atoms, in both of which radicals the α.γ-carbon atoms are bound to two nitrogen atoms, and
   R is a member selected from the group consisting of hydrogen, lower alkyl, lower alkoxy and halogen,
   (b) the corresponding salts of compound of formula (a) with a carboxylic acid selected from the group consisting of acetic acid, adipic acid and sebacic acid, and
   (c) the corresponding n-acylated derivatives of the compound of formula (a) wherein the acylating group is selected from the group consisting of alkanoyl of from 1 to 4 carbon atoms, benzoyl, amidoadipoyl, and amido-terephthaloyl, thereby obtaining a co-condensate of said active compound with the resulting polymeric polyamide.

References Cited by the Examiner
UNITED STATES PATENTS 2,305,675  12/42  Chenicek _____ 252—403
2,837,536   6/58  Fox _____ 260—570.5

FOREIGN PATENTS 821,384  10/59  Great Britain.

LEON J. BERCOVITZ, *Primary Examiner.*

MILTON STERMAN, *Examiner.*